No. 760,367. PATENTED MAY 17, 1904.
T. A. AMBROSE.
ROLLER FOR WINDOW BLINDS, MAPS, &c.
APPLICATION FILED FEB. 2, 1904.
NO MODEL.
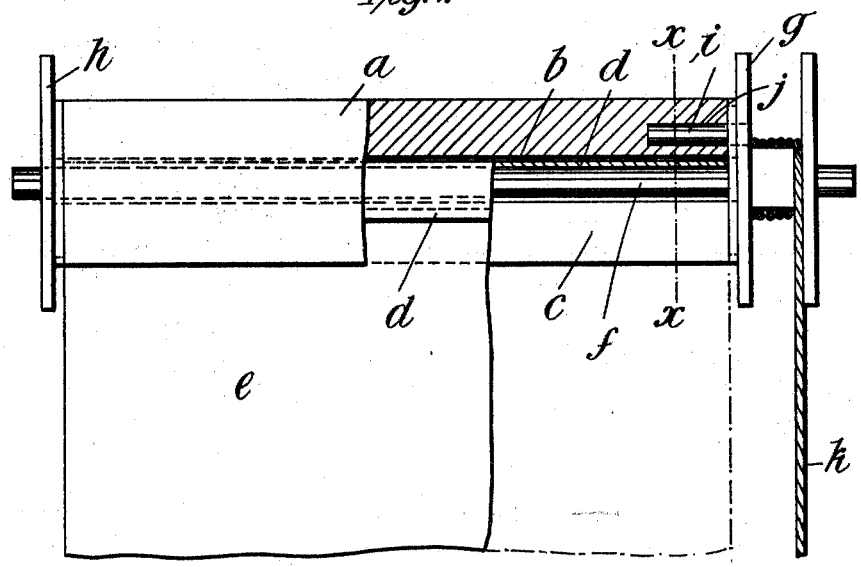
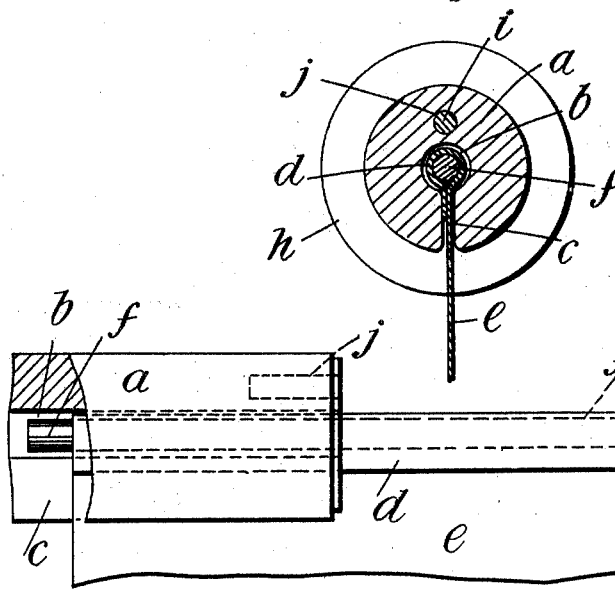

No. 760,367.

Patented May 17, 1904.

UNITED STATES PATENT OFFICE.

THOMAS AUGUSTUS AMBROSE, OF UXBRIDGE, ENGLAND.

ROLLER FOR WINDOW-BLINDS, MAPS, &c.

SPECIFICATION forming part of Letters Patent No. 760,367, dated May 17, 1904.

Application filed February 2, 1904. Serial No. 191,708. (No model.)

*To all whom it may concern:*

Be it known that I, THOMAS AUGUSTUS AMBROSE, a subject of the King of Great Britain and Ireland, residing at Strathmore Villa, Conley Mill Road, Uxbridge, county of Middlesex, England, have invented certain new and useful Improvements in and Relating to Rollers for Window-Blinds, Maps, and Analogous Articles, of which the following is a specification.

This invention relates to improvements in rollers for window-blinds, maps, and analogous articles, and has for its object a simple and ready means whereby such articles may be attached to and detached from the roller and at the same time to form the axis upon which such roller may be rotated.

Hitherto it has been customary in the case of wooden rollers to attach the blind to the same by means of tacks or other equivalent fastening devices, or in the case of metal rollers to attach the blind by means of clips or like devices. Now these methods are to be avoided, inasmuch as the blind or the like is difficult to hang straight, or the blind from suddenly running down or from other causes is liable to become torn. Now these defects I obviate in the following manner: The center of the roller is hollowed out throughout its entire length and a slot, slit, or groove is cut extending from the outer surface of the roller to the hollow center throughout its entire length. Such hollow center is adapted to receive a rod upon which is strung or fitted the blind or the like by means of passing the end of the latter through the slot, slit, or groove, the ends of the rod extending beyond the ends of the roller, forming the axis upon which the roller rotates. One end of the rod I provide with a pulley and to said pulley I fix a stud or the like adapted to engage in a recess or equivalent device in the roller, so as to prevent the rod turning round in the hollowed center of the roller.

In order that my said invention may be readily understood, reference is to be had to the following description and accompanying sheet of drawings, in which—

Figure 1 is a longitudinal sectional elevation, partly in section, and Fig. 2 is a transverse section on the line *x x*, Fig. 1. Fig. 3 is a longitudinal view illustrating the blind partly withdrawn from the roller.

Like letters of reference indicate corresponding parts in the several figures.

In carrying my said invention into effect I form the roller *a* with a central longitudinal hole *b* and connect the same to the circumference of the roller by a slot *c*, said hole and slot being adapted to receive the hem or pocket *d* of the blind or the like *e*, through which is passed the rod *f*, formed in one with or rigidly connected to a pulley *g* of any suitable construction, said rod extending centrally through and beyond the pulley *g* and cap or end plate *h*, as shown in Fig. 1, to form the axis of the roller and fitting when in use in brackets of any suitable construction. To prevent the rod *f* from rotating in the central hole *b*, I fix to the pulley *g* a stud or the like *i*, adapted to fit in a hole or recess *j*, so that the rod and roller rotate as one.

To fix a blind or the like in position, the rod *f* and its pulley *g* is withdrawn from the roller *a* and the rod passed through the hem or pocket *d* of a blind *e*. The rod now carrying the pocket or hem is slipped into the central hole *b* and along the slot *c* till it reaches the cap or plate *h*, through which it passes centrally to form the axis of the roller, the stud *i* in the meantime having engaged with the recess *j* in the roller. The blind is now fixed and can be, with the roller, placed in the brackets and pulled up and down by means of the cord *k* or other suitable device, the brackets preventing any accidental displacement of the longitudinal rod.

When it is desired to replace a blind or wash the same, it is only necessary to take the roller off the bracket and withdraw the rod and with it the blind, (see Fig. 3,) and then to slip the same off the rod or to simply withdraw the rod if a loose fit and pull the blind out through the slot.

Having now described my invention, what I claim as new, and desire to secure by Letters Patent, is—

1. In rollers for window and other blinds, maps and analogous articles the combination with a roller having a central longitudinal hole and slot connected therewith of a pulley, a rod rigidly attached thereto and extending through and beyond said roller to form an axis and means for connecting the pulley to the roller to rotate as one substantially as described.

2. In rollers for window and other blinds, maps and analogous articles the combination with a roller having a central longitudinal hole of a blind having a pocket or hem adapted to fit therein, a rod passing through said pocket or hem and extending beyond the ends of the roller to form an axis, a pulley fast on said rod, a cap or end plate, means for connecting the pulley and rod to the roller to rotate as one substantially as described.

In testimony whereof I have affixed my signature in presence of two witnesses.

THOMAS AUGUSTUS AMBROSE.

Witnesses:
BENJN. THOS. KING,
ROBT. HUNTER.